Patented June 28, 1927.

1,633,652

UNITED STATES PATENT OFFICE.

ARTHUR G. WADDINGHAM, OF JACKSON HEIGHTS, NEW YORK, ASSIGNOR TO COLOR CINEMA PRODUCTIONS, INC., OF NEW YORK, N. Y., A CORPORATION OF DELAWARE.

PHOTOGRAPHIC TRANSPARENCY AND METHOD OF COLORING SAME.

No Drawing.  Application filed May 8, 1926. Serial No. 107,789.

This invention relates to photographic transparencies and method of coloring same for the production of natural color pictures, and more particularly relates to motion picture positive film strips of the double coated type; that is, strips having photographic emulsion on both sides of the base.

It has been proposed heretofore to provide a film strip of this character having positive images on both sides of the film with the images opposite each other on the strip representing the same movement phase of the scene photographed, but registering, or representing, different (complementary) color values of the scene. Usually one side of the film base carries images representing the red color values of the scene and the opposite side of the base carries images representing the green color values of the scene, and to procure natural color pictures on the projection of the film by means of a projector it has been proposed to first render the images on the film red by the application of an intensifying bath including uranium or copper salt, and then to render blue, blue-green or green the images which represent the green color values of the scene by applying individually to the appropriate side of the film a bath containing a ferric salt. However, treatment of this sort is very hard to control, and with the baths heretofore proposed for the purpose it is very difficult to obtain a satisfactory intensity or color balance between the opposite images, and, as is well known, improper intensity or color balance is fatal to the reproduction of natural colors on projection. These baths require a lightly developed black silver image to avoid too great intensity. Also, these baths are unstable, liable to stain, and rapidly deteriorate in their power and speed of reaction.

The principal object of my invention is to provide a method of coloring films of the type referred to which renders the color control less difficult and by which it is easier to procure the intensity and balance of colors which, on the projection of the film, gives brilliant reproduction of the scene in natural colors that are faithful and clear, and giving clear whites.

A further object of my invention is to provide improved coloring baths for coloring films of the character referred to, and which tend to improve the brilliancy, clearness, naturalness and balance of the colors on projection.

Another object of my invention is to provide a photographic transparency having the improved characteristics above referred to.

Other objects of my invention will be in part obvious and in part pointed out hereinafter.

Various methods are known for photographically obtaining on opposite sides of the double coated film the two complemental series of images, representing respectively red and green color values of the scene photographed, each pair being in exact registry, the same size and taken at the same time from the same point of view. Since this step in the production of the color transparency does not form a part of the present invention, a description of such methods will be omitted as unnecessary. After such exposure of both sides of the film, the film is developed, rinsed, fixed and washed in the usual manner; following the well-known procedure used for motion picture film of the conventional type adapted for projection of non-colored pictures.

In accordance with my invention the film is now immersed in a bath composed of:

Potassium ferricyanide, 25 lbs.; ammonia water, 3 lbs. 8 oz.; water, to 86 gallons.

Time of immersion at 67° F. is 2 to 3 minutes, after which the film is washed for 15 minutes and then transferred to the red processing bath composed of:

Uranium nitrate, 9 lbs. 5 oz.; hydrochloric acid, 9 lbs. 5 oz.; water, to 86 gallons.

Time of immersion at 67° F. is 4 to 5 minutes, which changes the previously treated silver ferrocyanide image to red-uranyl silver ferrocyanide. At the termination of this period, the film is washed in running water for 5 minutes, and then placed in a weak thiosulphate solution as follows:

Sodium thiosulphate, 140 lbs.; water, to 86 gallons.

The function of this bath is to remove the silver from the image and leave only red-uranyl ferrocyanide, thus giving transparency. Time of immersion at 67° F. in this bath is one minute. The film is then given a final washing of 15 to 20 minutes in running water, removed, and the surplus water abstracted and, optionally, dried.

The film now has the images on both sides colored red. Then, the side of the film which carries the images representing the green color values of the scene is subjected to the action of a bath composed of:

Ferrous sulphate, 17.5 oz.; ferric chloride, 5 oz.; sulphuric acid, 2 oz.; water, to 16 pints, 14 oz.

This application may be made by brush, cloth, or spray, or preferably by running the side of the film to be treated over rollers wetted with the bath solution. Upon such treatment, the images subjected to the bath quickly commence to change from red-uranyl ferrocyanide to iron ferrocyanide, due to the replacement of red-uranyl by iron. About six minutes' duration will produce the complementary color desired. After the application of this bath, the film is washed to remove excess acid, one minute should suffice, the surplus water removed, and dried.

A film of the character described having the color applied thereto in the manner and by means of the bath solutions stated will, upon projection, deliver clear and brilliant pictures in colors having the naturalness and balance as recorded in the printing of the film, and, provided the photographing, printing and development have been properly carried out, by following this invention the difficulty heretofore encountered of properly coloring the film to yield brilliant and clear reproduction in natural and balanced colors on projections is lessened considerably. Moreover, the process is quick, inexpensive, and the baths are stable.

Having described my invention, what I claim is:

1. A process of coloring a photographic double coated motion picture film having developed images recording different color values of a scene on opposite sides of the film, which includes bleaching the film on both sides, washing the film, applying to both sides of the film a bath including uranium nitrate, to color the images on both sides of the film red, washing the film, fixing the film, and, after washing the film again, subjecting the images recording the green color values of the scene to a bath composed of ferrous sulphate, ferric chloride, sulphuric acid and water.

2. A process of coloring a photographic double coated motion picture film having developed images recording different color values of a scene on opposite sides of the film, which includes bleaching the film on both sides, washing the film, applying to both sides of the film a bath including uranium nitrate and hydrochloric acid in approximately equal quantities, to color the images on both sides of the film red, washing the film, fixing the film, and, after washing the film again, subjecting the images recording the green color values of the scene to a bath composed of ferrous sulphate, ferric chloride, sulphuric acid and water.

This specification signed this 6th day of May, 1926.

ARTHUR G. WADDINGHAM.